United States Patent [19]

Gontin

[11] Patent Number: 4,785,169
[45] Date of Patent: Nov. 15, 1988

[54] METHOD OF CORRECTING ERRORS IN HORIZON SENSORS CAUSED BY RADIANCE VARIATIONS

[75] Inventor: Richard A. Gontin, Rye, N.Y.

[73] Assignee: Barnes Engineering Company, Shelton, Conn.

[21] Appl. No.: 939,905

[22] Filed: Dec. 9, 1986

[51] Int. Cl.[4] ............................................... G01J 1/34
[52] U.S. Cl. ..................................... 250/340; 250/342
[58] Field of Search ............... 250/338, 342, 347, 351, 250/349, 340

[56] References Cited

U.S. PATENT DOCUMENTS

| | | | |
|---|---|---|---|
| 3,486,024 | 12/1969 | Astheimer | 250/338 |
| 3,551,681 | 12/1970 | Astheimer | 250/349 |
| 3,714,432 | 1/1973 | Jalink, Jr. | 250/340 |
| 4,665,314 | 5/1987 | Haberl | 250/342 |

Primary Examiner—Janice A. Howell
Assistant Examiner—Richard Hanig
Attorney, Agent, or Firm—Parmelee, Bollinger & Bramblett

[57] ABSTRACT

A horizon sensor having a pair of adjacent infrared detectors which view the earth's horizon either statically or by scanning is provided with a second order radiance correction to reduce errors in determining the true position of the horizon due to radiance variations of the earth due to changes in latitude and seasons particularly at lower altitudes. The second order correction is empirically determined from a large number of horizon profiles, and in two illustrative examples for different types of sensors, the correction may be readily obtained from a linear function related to the peak radiance of the horizon profiles.

4 Claims, 3 Drawing Sheets

METHOD OF CORRECTING ERRORS IN HORIZON SENSORS CAUSED BY RADIANCE VARIATIONS

BACKGROUND OF THE INVENTION

This invention relates to horizon sensors for determining the position of the horizon, and more particularly to providing a second order radiance correction for such sensors to correct errors caused by radiance variations.

It is often necessary to determine the attitude of a satellite with respect to the earth. One means of doing this is to sense the position of the earth's horizon in three or more directions. In order to operate both in day and night, infrared sensors are usually used, which sense the warm earth against cold space. A simple horizon location concept is shown in FIG. 1. An infrared detector with a rectangular field of view is oriented toward and straddling the horizon as shown and is termed a static type sensor. The signal S from this detector will be proportional to X R, where X is the length of the detector field subtended by the earth and R is the radiance of the earth. If R is known, the position of the horizon with respect to the lower edge of the detector field can readily be determined by X=(k S)/R where k is a calibration constant including the width of the detector and its responsivity. For simplicity, it will be assumed that k is unity in the following discussion.

This simple design is generally inadequate because the earth radiance varies with geographic location and season. This problem can be overcome to a certain extent by using a pair of detectors, A and B as shown in FIG. 2. Detector A functions as described previously. Detector B has a smaller field located at the lower or earth edge of detector A, and its function is to continually view and measure the earth radiance level. This it can do, since its field will always be fully filled by the earth, whereas the signal from detector A involves both R and X.

The signal $S_B$ on detector B is given by bR. Thus $R = S_b/b$ and:

$$X = \frac{S_A}{R} = \frac{b\,S_A}{S_B} \qquad \text{(Eq. 1)}$$

This may be considered a first order radiance correction, since it assumes that the radiance is uniform over both detectors.

At lower altitudes, one must take into consideration the fact that the horizon is not sharp but diffuse because of the atmosphere. This results in a decreasing radiance with altitude above the horizon which is known as the horizon profile. It has been found that these profiles are most uniform in the 14–16 micron spectral region, which is a carbon dioxide absorption band. The reason for this is that carbon dioxide is uniformly mixed in the atmosphere and blocks any radiation from variable sources in the lower atmosphere such as clouds. However, even in this $CO_2$ absorption band, the profiles do change with latitude and season.

FIG. 3 shows calculated profiles in January for a set of north latitudes. If a radiance-corrected horizon sensor of the type shown in FIG. 2 is used at an altitude where these profiles subtend an appreciable angle, and X is computed from Equation 1, significant errors will result.

SUMMARY OF THE INVENTION

Accordingly, it is an object of this invention to provide a new and improved method of correcting errors in horizon sensors caused by radiance variations.

A further object of this invention is to provide a new and improved method of correcting radiance variations which may be applied to both static as well as scanning type horizon sensors.

Still another object of this invention is to provide a new and improved method of determining the true position of the horizon by providing a second order radiance correction which in many applications can be simply applied using an empirically derived linear function related to a radiance measurement.

In carrying out this invention in one illustrative embodiment thereof, a horizon sensor having a first and second detector means views the earth from an orbiting satellite. The position of the earth's horizon is determined by the positioning of the first detector means with respect to the earth's horizon. The radiance level of the field of view of the adjacent detector means is provided from the second detector means and a first order radiance correction is provided in determining the position of the earth's horizon. A plurality of horizon profiles in the carbon dioxide band are determined for various latitudes and seasons and a second correction based on an empirically determined functional relationship between the radiance and said horizon profiles is provided and subtracted from the horizon position to correct for errors in radiance.

Two specific examples are illustrated for horizon sensors having rectangular field of view as well as inverted abutting triangular fields of view. The empirically functional relationship derived from the plurlity of horizon profiles for different latitudes and seasons is in many cases a straight line linear function which simplifies the derivation of the second order radiance correction.

BRIEF DESCRIPTION OF THE DRAWINGS

The invention, together with further objects, aspects, advantages and features, thereof, will be more fully understood by reference to the following description considered in connection with the accompanying drawings.

DESCRIPTION OF THE PREFERRED EMBODIMENTS

It has been found in the present invention that the error in the true position of the horizon caused by radiance variations as discussed hereinbefore can be greatly reduced by making a second order correction based on a radiance measurement. The form of this second order radiance correction is determined empirically and depends on the particular type of horizon sensor involved. In the following examples, two different types of horizon sensor detector configurations will be employed in illustrating the implementation of the second order correction, but it should be understood that other detector configurations in either scanning or static balance type horizon sensor may be employed.

EXAMPLE #1

Figure 1:
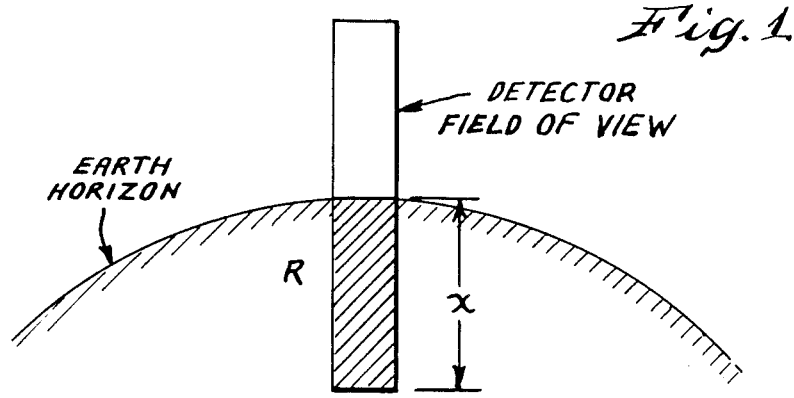
FIG. 1 is a diagrammatical illustration of a horizon sensor having a single detector with a field of view straddling the earth's horizon.
Figure 2:
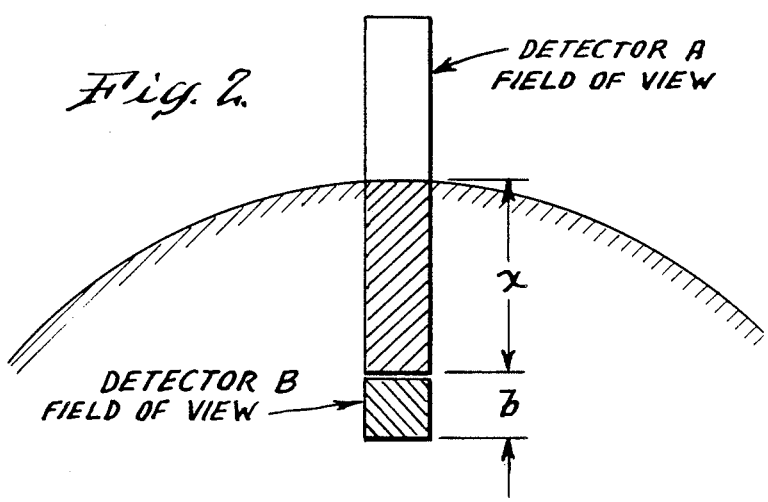
FIG. 2 is a diagrammatical illustration modifying the sensor illustrated in FIG. 1 using a second detector to provide a first order radiance correction in order to determine the position of the earth's horizon.
Figure 3:
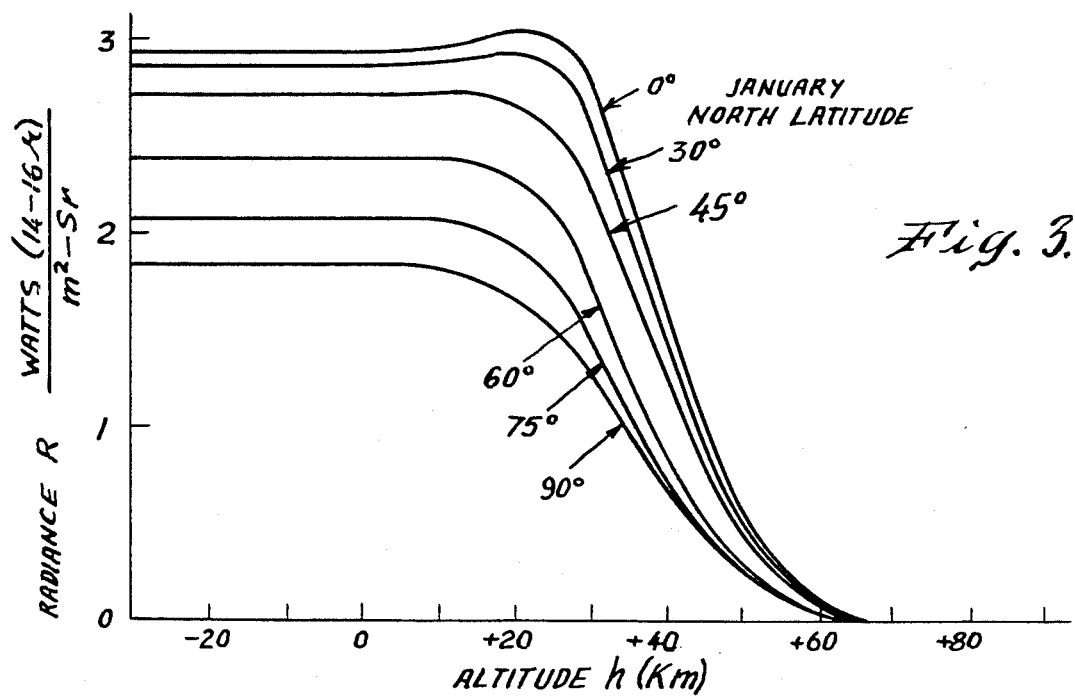
FIG. 3 illustrates a plurality of calculated earth's radiance profiles in January for a set of north latitudes.
Figure 4:
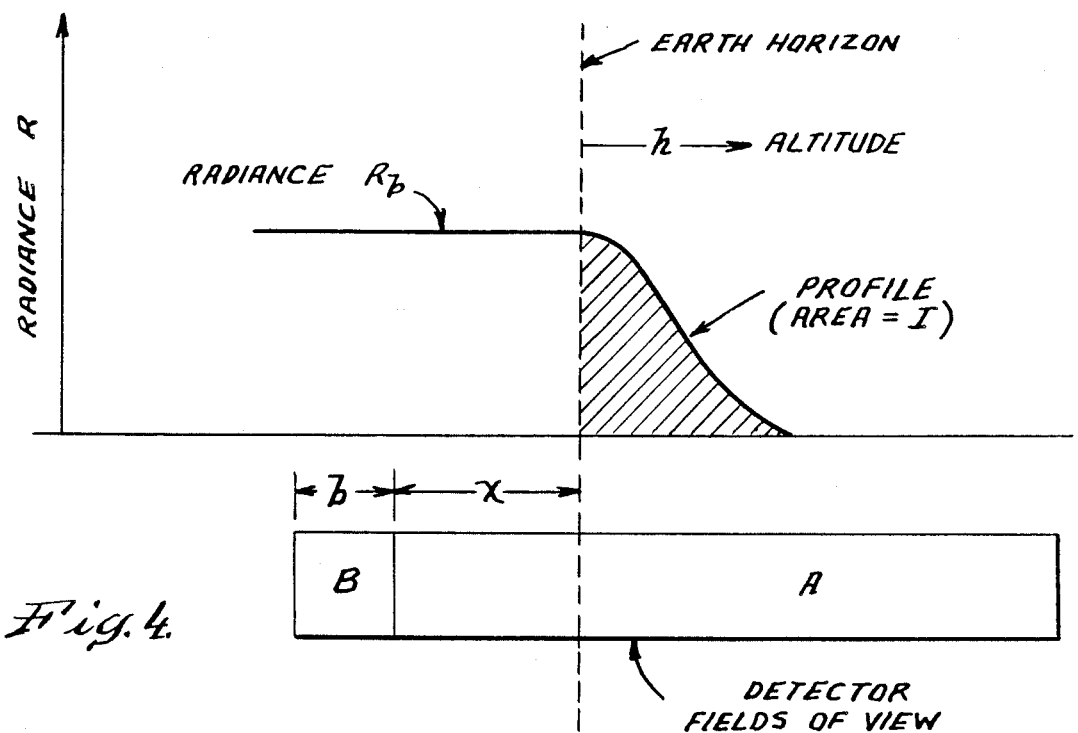
FIG. 4 diagrammatically illustrates a horizon sensor with a detector arrangement shown in FIG. 2 viewing a horizon profile as shown in FIG. 3.

The first example is for a radiance-corrected horizon sensor of the type shown in FIG. 2. FIG. 4 shows this sensor viewing a horizon profile such as shown in FIG. 3. The object is to derive an output X indicating the position of the true horizon with respect to the edge of the detector. It will be seen from FIG. 3 that the radiance below the true horizon is constant for a given latitude and season. This radiance will be called $R_b$. The signal on detector is then:

$$S_A = X R_b + I \qquad \text{(Eq. 2)}$$

where I is the integrated radiance of the profile with altitude h:

$$I = \int_{h=0}^{h=\infty} R \, dh$$

The signal on detector B is:

$$S_B = b R_b \text{ or } R_b = \frac{S_B}{b}$$

Figure 5:
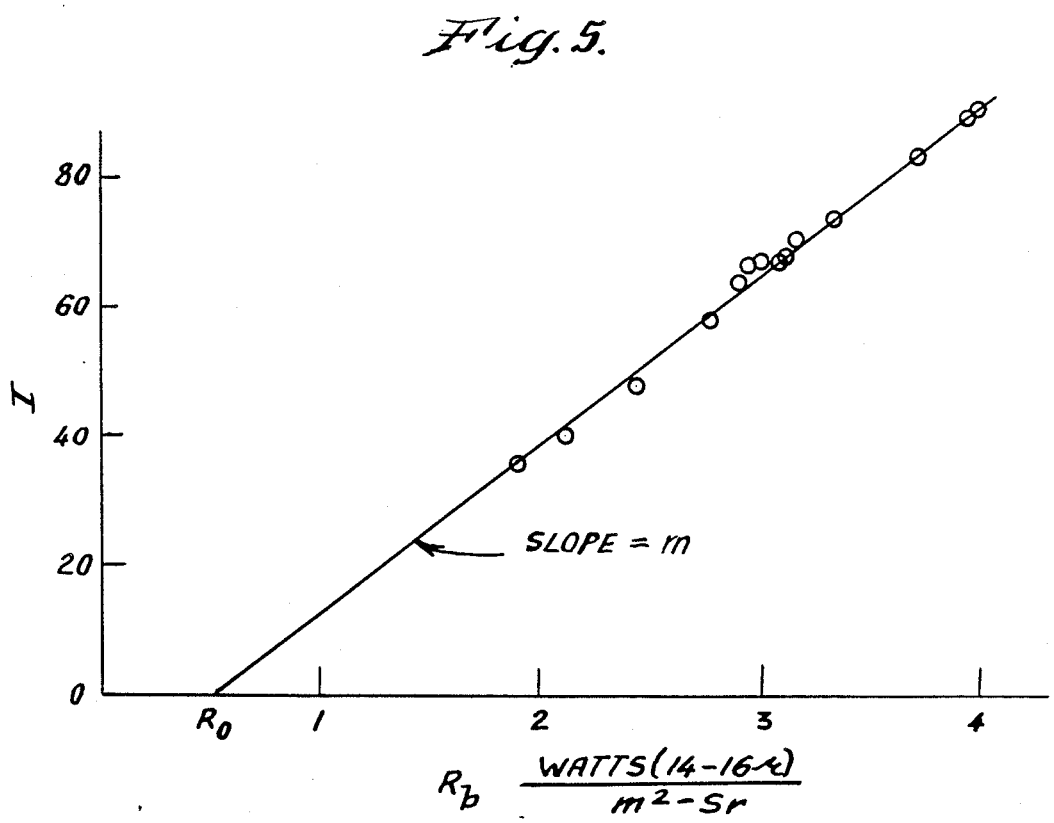
FIG. 5 shows an empirically derived plot of I(the integrated radiance of the profiles shown in FIG. 4)vs $R_o$ which is the radiance below the true horizon which is constant for a given latitude and season.

It has been found empirically that I is linearly related to $R_b$ as seen in FIG. 5, which is a plot of I vs $R_b$ for a large number of profiles at different latitudes and seasons as follows:

$$I = m (R_b - R_o)$$

where m and $R_o$ are constants.

$$R_o = X \text{ intercept} = 0.5 \, \frac{\text{watts}}{m^2 - \text{ster}}$$

Substituting for $R_b$ and I in Equation 2 and solving for X:

$$X = \frac{b S_A}{S_B} - m \left(1 - \frac{b R_o}{S_B}\right) \qquad \text{(Eq. 3)}$$

The second term is the second order correction for the profile. For dimensional consistency X, b and m must be expressed in the same units (km, degrees, etc.).

The correction term is always negative, since it is removing the profile signal from $S_A$.

The second order correction concept was described in the foregoing applied to a static sensor, however, it could equally well be used in a scanning system. For example, the detectors in FIG. 4 could be scanning onto the earth (i.e., moving toward the left). First, a signal would be produced by detector B and then the signal from A would grow. The horizon would be located at the leading edge of a detector A when its signal grew to equal I that is when:

$$S_A = I = m \left(\frac{S_b}{b} - R_o\right) \qquad \text{(Eq. 4)}$$

where m, b and $R_o$ are the constants defined previously.

It is also possible to utilize a single detector and to derive the A and B detector signals from the single detector at different times as the detector is scanned over the horizon. For example, assume that a single shorter detector A is used and scanned from right to left. The signal when this detector output becomes constant (derivative=0) is $R_b$ and is equivalent to $S_b$. The value is stored and on the next scan the horizon would be located at the point determined by (Eq. 4) given in Example #1. Alternately, the signal vs. time can be stored during the horizon crossing in digital or analog form and both $S_A$ and $S_B$ obtained on the same scan of the horizon.

EXAMPLE #2

Figure 6:
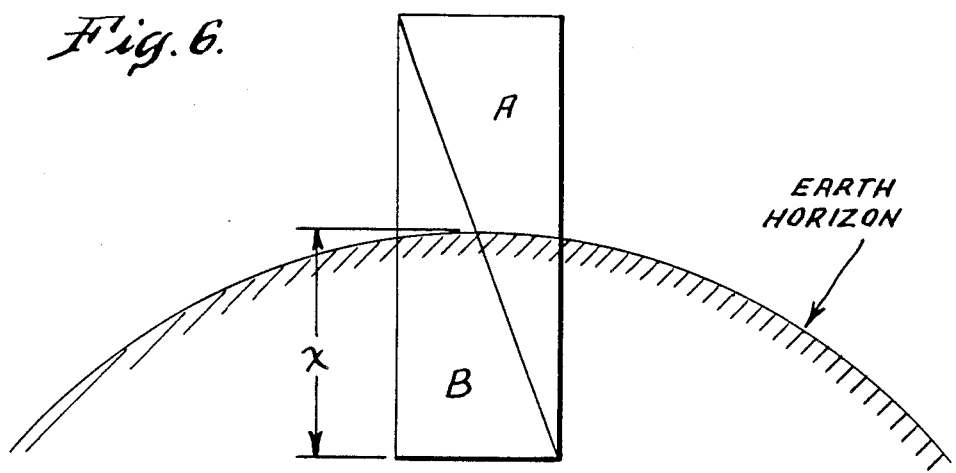
FIG. 6 is a diagrammatic illustration of a double triangle static horizon sensor which type of sensor may be utilized in accordance with the present invention.

In this example, a second order correction is applied to a double triangle static horizon sensor of the type described in U.S. Pat. No. 3,551,681 and shown in FIG. 6. It can easily be shown that the horizon position X, and the radiance R are given by:

$$X = \frac{2 S_A}{S_A + S_B} \qquad \text{(Eq. 5)}$$

$$R = \frac{(S_A + S_B)^2}{2 S_A} \qquad \text{(Eq. 6)}$$

where $S_A$ and $S_B$ are the signals from the two detectors A and B.

The expression for X is independent of the radiance and represents a first order correction assuming uniform radiance over the detector fields of view. If the radiance is not uniform because of the existence of a profile or other reasons, an error will result in X, which can be removed by an empirically-derived second order correction based on the value of R calculated from Equation 6.

Figure 7:
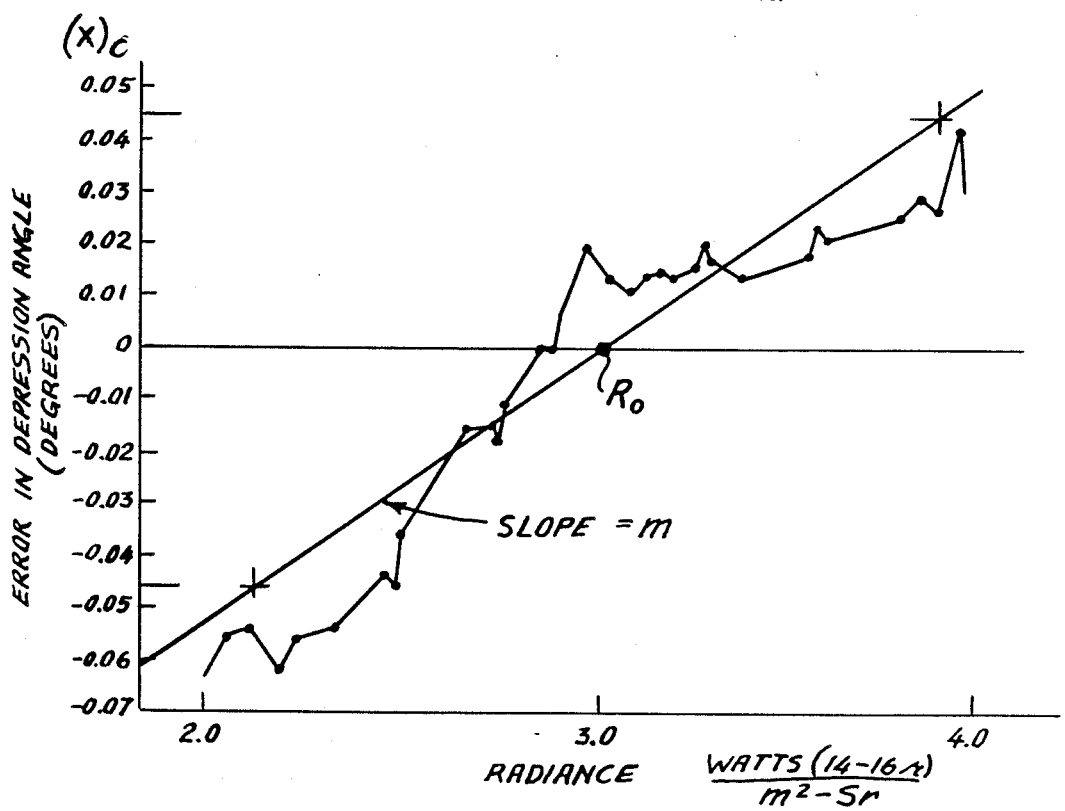
FIG. 7 is a plot of errors in depression angle indicated by a double triangle sensor vs. radiance indicated by the sensor for a wide range of horizon profiles computed for all seasons and latitudes at an altitude of 833 km in which the second order correction is derived from a best fit line or linear function.

FIG. 7 shows the variation in X resulting from a wide range of profiles computed for all seasons and latitudes at an altitude of 833 km as a function of R. The length of the detectors (X=1) was taken as 5.2° and the true horizon location was unchanged. A best fit straight line is shown having the parameters:

$$(X)_c = m R 30 p$$

where:
m = slope = 0.152
p = y intercept = 0.152
Applying this correction, we get:

$$X = \frac{2 S_A}{S_A + S_B} + (X)_c$$

It should be noted that, in order to determine satellite attitude, it is not necessary to locate the true ground horizon, but only a point above (or below) the ground horizon that is invariant with location and season. The $(X)_c$ correction is of this nature, since FIG. 7 only shows the variation in X with season and latitude.

Accordingly, an empirically-determined second order radiance correction based on some measurement of the earth's radiance is applied to horizon sensors to more accurately determine the true position of the earth's horizon. This correction characteristic, which in the two examples illustrated above is expressed as a straight line linear function, is established by exercising the horizon sensor design on a set of computed horizon profiles representing various altitudes and seasons from which a relation between horizon error and radiance is sought. Although the linear result illustrated in the two examples is easier to implement and is preferable, the second order correction may in a more complex relationship be provided in the form of other functions or a look-up table.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. A method of correcting errors in the position of the earth's horizon as sensed by a horizon sensor caused by radiance variations which occur in accordance with the geographic location and season when the horizon sensor views the earth comprising the steps of:
   viewing the earth with a first and second adjacent detector means in a horizon sensor mounted in a satellite orbiting the earth,
   determining a first-order indication of the position of the earth's horizon from a first relationship between detector signals generated by said first and second detector means,
   determining the radiance of the earth horizon using a different relationship between the detector signals generated by said first and second detector means,
   computing a second-order correction to the earth's horizon position from a preestablished function of the earth's horizon radiance which includes establishing a functional relationship between the secondary order correction to the earth's horizon position from a set of horizon profiles in the carbon dioxide band for different latitudes and seasons, and
   deriving a corrected earth horizon position by applying said second-order correction to said first-order indication of the earth horizon position.

2. The method as claimed in claim 1, wherein said first and second detector means are rectangular in shape with said first detector means being A and second detector means being B, in which said step of providing said second order radiance correction is determined from the equation:

$$X = \frac{b S_A}{S_B} - m\left(1 - \frac{b R_o}{S_b}\right)$$

where
X = position of the true horizon with respect to the edge of detector A
b = length of detector B
$S_A$ = signal from detector A
$S_B$ = signal from detector B
m and $R_o$ = constants.

3. The method as claimed in claim 1, wherein said first and second detector means have triangular configurations which are inverted with respect to each other, said first detector means being detector A and said second detector means being detector B and in which said step of providing said second order radiance correction is derived from the equation:

$$X = \frac{2 S_A}{S_A + S_B} + (X)_c$$

where
X = Position of the invariant horizon
$S_A$ = signal from detector A
$S_B$ = signal from detector B
$(X)_c$ = 2nd order correction which is a function of R $$R = \text{Radiance for the correction}$$
$$= \frac{(S_A + S_B)^2}{2 S_A}$$

4. A method of correcting errors in the position of the earth's horizon as sensed by a horizon sensor caused by radiance variations which occur in accordance with geographic location and season when the horizon sensor views the earth comprising the steps of:
   scanning the earth with a detector means in a horizon sensor mounted in a satellite orbiting the earth,
   storing said detector signals wherein the horizon correction made will be determined on the same or subsequent scans of the horizon,
   determining a first-order indication of the position of the earth's horizon from a first relationship between detectors signals generated by said detector means at different times during the scanning of the earth by said detector means,
   determining the radiance of the earth's horizon using a different relationship between the detector signals generated by said detector means,
   computing a second-order correction to the earth's horizon position from a preestablished function of the earth's horizon radiance, and
   deriving a corrected earth horizon position by applying said second-order correction to said first-order indication of the earth's horizon position.

* * * * *